(12) United States Patent
Kawakami et al.

(10) Patent No.: US 7,505,230 B2
(45) Date of Patent: Mar. 17, 2009

(54) ROTATING DISK STORAGE DEVICE AND LATCH METHOD THEREOF

(75) Inventors: Takanori Kawakami, Kanagawa (JP); Shinichi Kimura, Kanagawa (JP); Satoshi Matsumura, Kanagawa (JP); Hiroki Kitahori, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 617 days.

(21) Appl. No.: 10/901,259

(22) Filed: Jul. 27, 2004

(65) Prior Publication Data
US 2005/0057857 A1    Mar. 17, 2005

(30) Foreign Application Priority Data
Sep. 11, 2003    (JP) .............................. 2003-320078

(51) Int. Cl.
G11B 5/54 (2006.01)
(52) U.S. Cl. ................................... 360/256.4
(58) Field of Classification Search .............. 360/256.4, 360/256
See application file for complete search history.

(56) References Cited

U.S. PATENT DOCUMENTS

| | | | | |
|---|---|---|---|---|
| 5,404,257 A * | 4/1995 | Alt ........................... | 360/256.4 |
| 5,543,986 A * | 8/1996 | Albrecht ................... | 360/256.4 |
| 6,028,746 A * | 2/2000 | Matsumura ............... | 360/256.4 |
| 6,147,841 A * | 11/2000 | Rao ......................... | 360/256.2 |
| 6,185,074 B1 * | 2/2001 | Wang et al. ............... | 360/256.4 |
| 6,327,119 B1 * | 12/2001 | Barina et al. .............. | 360/256.4 |
| 6,507,461 B1 * | 1/2003 | Kimura et al. ........... | 360/256.4 |
| 6,529,349 B1 * | 3/2003 | Byun et al. ............... | 360/256.4 |
| 6,680,822 B1 * | 1/2004 | Lin et al. .................. | 360/256.4 |
| 6,710,980 B1 * | 3/2004 | Hauert et al. ............ | 360/256.4 |
| 6,731,469 B2 * | 5/2004 | Boutaghou ............... | 360/256.4 |
| 6,917,497 B1 * | 7/2005 | Johnson et al. .......... | 360/256.4 |
| 7,035,053 B1 * | 4/2006 | Oveyssi et al. ........... | 360/256.4 |
| 7,248,440 B2 * | 7/2007 | Kim et al. ................. | 360/256.2 |
| 2002/0054456 A1 * | 5/2002 | Misso et al. .............. | 360/256.4 |
| 2003/0086210 A1 * | 5/2003 | Miyajima ................. | 360/256.4 |
| 2005/0013054 A1 * | 1/2005 | Miyamoto et al. ....... | 360/256.4 |

FOREIGN PATENT DOCUMENTS

WO    WO 00/74056 A1    12/2000

* cited by examiner

Primary Examiner—Brian E Miller
(74) Attorney, Agent, or Firm—Townsend and Townsend and Crew LLP; Rambod Nader

(57) ABSTRACT

A rotating disk storage device has a stopper mechanism and a latch mechanism for diminishing a shock imposed on an actuator head suspension assembly (AHSA) and permits positive retraction of the AHSA upon occurrence of an external shock or runaway. In one embodiment, the latch mechanism comprises an AHSA which is supported pivotably, a stopper which restricts a pivotal movement in a pivot direction of the AHSA, an inertia member adapted to move pivotally in a corresponding pivot direction when the AHSA moves pivotally in the pivot direction while causing the stopper to be deformed elastically, and a latch member which has an engaging portion and which, upon receipt of the torque from the inertia member, moves pivotally in a direction opposite from the corresponding pivot direction, and causes the engaging portion to move to a latching position. Shock energy of the AHSA is attenuated by both stopper and inertia member.

21 Claims, 8 Drawing Sheets

ROTATING DISK STORAGE DEVICE AND LATCH METHOD THEREOF

BACKGROUND OF THE INVENTION

The present invention relates to a rotating disk storage device such as a magnetic disk drive or a magneto-optic disk device and, more particularly, to a mechanism for cushioning a shock imposed on an actuator and causing the actuator to stop at a retracting position upon abutment of the actuator against a stopper at a higher speed than usual due to, for example, external shock, runaway, or cut-off of power supply in a rotating disk storage device.

In a magnetic disk drive, a head/slider supported by an actuator assembly moves pivotally in an approximately radial direction of a rotating magnetic disk while flying over a recording surface of the magnetic disk through a slight spacing from the recording surface to read and write data. A load beam which supports the head/slider produces a pressure in a direction in which the head/slider is pushed against the recording surface of the magnetic disk, and an air bearing surface of the slider is balanced with buoyancy which the air bearing surface undergoes from a current of air created on the surface of the magnetic disk, whereby a predetermined gap is ensured between the air bearing surface and the recording surface.

While the magnetic disk rotates at a predetermined number of revolutions, the slider and the recording surface of the magnetic disk scarcely contact each other under the action of an air current created on the disk surface. However, if the head/slider lands on the recording surface of the magnetic disk whose rotation has stopped, the head/slider is attracted to the recording surface of the magnetic disk due to, for example, a lubricant applied to the recording surface, inter-attraction between smooth surfaces of the recording surface and the air bearing surface, and pressure of the load beam. If the magnetic disk is rotated in the attracted state of the head/slider, a phenomenon called sticktion will occur, which may flaw the surface of the slider or the magnetic disk or may result in start-up being impossible. If the number of revolutions of the magnetic disk lowers to a level below a predetermined value, the buoyancy between the slider and the recording surface decreases and both come into contact with each other, with consequent likelihood of damage. Therefore, it is also necessary to prevent such a decrease in the number of revolutions of the magnetic disk.

Thus, in the load/unload type magnetic disk drive, at the time of stopping the rotation of the magnetic disk, the head/slider is retracted to a retracting position called ramp which is provided outside the recording surface of the magnetic disk, then the magnetic disk is started up and the head/slider is held in the ramp until the rotation of the magnetic disk becomes a normal rotation. In the load/unload type magnetic disk drive there is provided an outer crash stop formed of an elastic material such as rubber to define a limit position of a pivotal range when the actuator assembly moves pivotally toward the retracting position.

In a normal retracting motion of the actuator assembly, the actuator assembly is moved pivotally at a controlled speed from the recording surface to the retracting position until light collision with the outer crash stop to turn OFF a voice coil motor (VCM). The outer crash stop attenuates a shock energy of the actuator assembly, causing the actuator assembly to stop at the retracting position which lies above the ramp. When the magnetic disk is next rotated and the head/slider is moved to the recording surface, it is necessary that the actuator assembly be held at such a degree of strength as permits it to turn quickly with the driving force of VCM. In other words, it is necessary to avoid fixing it firmly at the retracting position.

On the other hand, while the magnetic disk drive is carried alone or in a mounted state onto a portable device, it may undergo a shock comprising various parameters such as strength, angle, position, and rotation from the exterior. Such a shock from the exterior may cause the head/slider to move to the recording surface of the magnetic disk which is at a standstill, giving rise to sticktion. Further, in the event of sudden power failure while the magnetic disk drive operates and the head/slider is making access to the recording surface of the magnetic disk, the actuator assembly is moved to the retracting position by utilizing a counter-electromotive force of the magnetic disk which is rotating or by utilizing an electric charge stored in an electronic circuit to prevent the occurrence of sticktion.

In this connection there is adopted a circuit configuration wherein the speed of the actuator assembly becomes fairly higher than the normal retracting speed in order to permit positive retraction with limited energy. After collision of the actuator assembly with the crash stopper, the actuator assembly may rebound and the head/slider may return to the recording surface of the magnetic disk whose number of revolutions is in a lowered state below a predetermined value.

Further, since a control circuit is constructed so that even when control of the actuator assembly becomes impossible during operation, this state is detected and the head/slider is moved immediately up to the retracting position, there may occur a phenomenon similar to the above. For example, in WO 00/74056, there is described a technique for holding the actuator assembly in the retracting position so as not to rebound and move to the operation range even in the event of violent collision thereof with the stopper.

In FIG. 8 of WO 00/74056 there are shown a lever 15 which is supported pivotably about a pivot shaft 18 and a latch 16 having an engaging concave 15b and an engaging side portion 15c both capable of engaging with operating pins 16a and 16b of the lever 15, the latch 16 being supported pivotably about a pivot shaft 19. When an actuator arm 6 undergoes a strong shock and moves pivotally in C1 direction and tends to move pivotally in B1 direction as a reaction of collision with an outer crash stop 17, a sensor projection 16e formed in the latch 16 is pushed by the actuator arm and causes the latch 16 to move pivotally in B3 direction, thereby preventing the latch from jumping out from its home position.

A rotating disk storage device having a rotating disk storage medium undergoes a shock defined by various parameters from the exterior while it is in operation and not in operation. Against such a shock it is necessary to prevent the head/slider from landing on the recording surface of the recording medium which is at a standstill or is rotating at a speed below a predetermined number of revolutions. This is also true of the case where the control of an actuator head suspension assembly (hereinafter referred to simply as "AHSA") becomes unstable or the case where there occurs runaway thereof or where the supply of electric power stops suddenly during operation.

For restricting the pivoting range of AHSA, the storage device is provided with an outer crash stop and an inner crash stop on both sides of the pivoting range, both outer and inner crash stops being formed of an elastic material. In a load/unload type storage device using a ramp, an AHSA is brought into collision with the outer crash stop when retracted to attenuate collision energy and is stopped at a position close to the outer crash stop, allowing a head/slider to be retracted to the ramp. However, it is impossible for the outer crash stop to fully attenuate the collision energy of the AHSA which collides with the outer crash stop at a high speed. Moreover, the selection of an elastic material and temperature management are difficult. Thus, it is not easy to control the attenuating action. Particularly in an ultra-small sized rotating disk storage device such as a one-inch type, the space for provision of an elastic member is restricted and there occurs a great temperature change. Therefore, it is not easy to let an elastic effect of such an elastic member as rubber be exhibited appropriately.

Further, in the method disclosed in WO 00/74056, there is a fear that a latching shock may exert a bad influence on AHSA as the latching frequency for AHSA increases. The AHSA is constructed of precision parts for obtaining a satisfactory follow-up characteristic of head/slider, so there is a fear that the characteristic may deteriorate as the latching shock increases. Therefore, in a latch mechanism for latching AHSA after collision with the outer crash stop and rebounding, it is desirable to minimize the latching frequency and fully attenuate AHSA energy when latching. For this reason it is desired to provide a mechanism to let AHSA be retracted to the retracting position without giving a shock thereto against external shock, runaway during operation, or power failure.

BRIEF SUMMARY OF THE INVENTION

Accordingly, it is a feature of the present invention to provide a rotating disk storage device having a stopper mechanism for quickly attenuating impact energy imposed on an AHSA when the AHSA collides with a crash stop at a high speed due to external shock, runaway during operation, or power failure. It is another feature of the present invention to provide a rotating disk storage device having a latch mechanism capable of decreasing the frequency of AHSA being latched by the latch mechanism after rebounding from the stopper mechanism. It is a further feature of the present invention to provide a rotating disk storage device having a latch mechanism capable of decreasing shock to a greater extent at the time of latching AHSA after rebounding from the stopper mechanism. It is a still further feature of the present invention to provide such a latching method.

In the stopper mechanism according to embodiments of the present invention, with both an elastic member and an inertia member provided in a rotating disk storage device, when an AHSA collides with the elastic member at a high speed due to external shock or runaway, collision energy of the AHSA as kinetic energy of the inertia member is consumed and thereby cushioned, in addition to a shock absorbing action of the elastic member, to thereby enhance the shock absorbing effect. When the AHSA collides with the elastic member, kinetic energy is imparted to the inertia member while deforming the elastic member elastically. Furthermore, the inertia member which exhibits a shock absorbing action is also allowed to exhibit an inertial action against external shock and is allowed to serve as a component of the latch mechanism.

By rebound or rebounding is meant a phenomenon such that the AHSA which has collided with the elastic member gets over its retracting range by reaction and the head/slider is moved to the recording surface of the recording medium. When AHSA collides with the elastic member at a high speed, collision energy is attenuated by both elastic member and inertia member to prevent rebounding, or energy after rebound is suppressed to a minimum. With this construction, the shock absorbing effect against a high-speed collision of AHSA is improved. In addition, it is possible to diminish the chance of latching rebound by the latch mechanism. Further, even when rebound is to be latched, the latching can be done after the attenuation of energy and therefore it is possible to diminish a latching shock imposed on AHSA.

In a first aspect of the present invention there is provided a rotating disk storage device comprising a rotating disk storage medium having a recording surface; an actuator head suspension assembly with head/slider mounted thereon, the actuator head suspension assembly being pivotable in both first and second directions; an elastic member which restricts a pivoting range in the first direction of the actuator head suspension assembly; and an inertia member which receives force from the actuator head suspension assembly and moves at least in a partial period in which a part of the actuator head suspension assembly comes into abutment against the elastic member, causing the elastic member to be deformed elastically, and in this state moves pivotally in the first direction.

Since the rotating disk storage device is provided with an inertia member which undergoes force from the actuator head suspension assembly and moves at least in a partial period in which a part of the actuator head suspension assembly comes into contact with the elastic member and moves pivotally in the first direction while causing the elastic member to be deformed elastically, the actuator head suspension assembly which has been abutted against the elastic member by its pivotal movement in the first direction is cushioned by the elastic member and at the same time causes the inertia member to move, thereby consuming collision energy. There can be realized a stopper mechanism capable of enhancing the shock absorbing effect to a greater extent than cushioning a shock with use of the elastic member alone.

The inertia member is constructed so as to receive collision energy of AHSA which has collided with the elastic member, as kinetic energy, and the direction of motion may be rectilinear, rotational, or a combination of the two. The inertia member can consume a large amount of energy if the mass or moment of inertia is set large. However, if the mass or moment of inertia is too large, the AHSA will take a repulsive action before conversion of collision energy into kinetic energy; while if it is too small, it is impossible to absorb energy sufficiently. Therefore, the mass or moment of inertia is set at a value which permits appropriate energy conversion.

Since the inertia member exhibits its shock absorbing action under kinetic energy, its temperature characteristic does not pose any problem and it ensures an excellent shock absorbing performance without deterioration over a long-term use. By constituting the inertia member as a rotating motion member, its installation is easy even in a narrow space. It is optional whether the elastic member is to be supported from a casing or to be attached to the AHSA. Further, a part of AHSA may be formed as an elastic structure.

It is not necessary to supply energy to the inertia member over the entire period in which the elastic member is deformed elastically, provided that a desired amount of shock energy can be converted to kinetic energy or rotational energy even in part of the elastic deformation period. When a part of the actuator head suspension assembly comes into contact with the elastic member at a first position, causing the elastic member to be deformed elastically, and in this state moves pivotally in the first direction and reaches a second position, the inertia member receives force from the actuator head suspension assembly and starts motion, whereby in the initial stage of collision, the collision is cushioned by the elastic member and it is possible to halfway add the shock absorbing function of the inertia member. Accordingly, even if the mass is set large for enhancing the shock absorbing effect of the inertia member, it is possible to suppress a shock which is induced the moment the AHSA applies a force to the inertia member, and also possible to increase energy which is converted to the motion of the inertia member.

In a second aspect of the present invention there is provided a rotating disk storage device comprising a rotating disk storage medium having a recording surface; an AHSA with head/slider mounted thereon and having a to-be-engaged portion, the AHSA being pivotable in both first and second directions; an elastic member which restricts a pivoting range in the first direction of the AHSA; and a latch mechanism capable of latching the AHSA to prevent the head/slider from moving onto the recording surface when the rotating disk storage medium rotates at a number of revolutions below a predetermined number of revolutions or is at a standstill. The latch mechanism comprises an inertia member which receives force from the actuator head suspension assembly and moves at least in a partial period in which a part of the AHSA comes into contact with the elastic member, causing the elastic member to be deformed elastically, and in this state moves pivotally in the first direction, and a latch member having an engaging portion for latching the to-be-engaged portion to restrict a pivotal movement in the second direction of the actuator head suspension assembly, the latch member receiving force from the moving inertia member, thereby moving and causing the engaging portion to move up to a latch position.

The predetermined number of revolutions of the rotating disk storage device indicates a number of revolutions set for read or write, or a number of revolutions as a limit at which the slider buoyancy decreases and the head/slider cannot function to a satisfactory extent. By latch is meant to temporarily limit the pivotal movement of AHSA in the direction of moving at least the head/slider to the recording surface in the latch position. It is also included to fix AHSA temporarily in the latch position and limit its pivotal movement in both directions. The AHSA includes a type called COM type in which a head suspension assembly is attached to a carriage and a type in which head gimbals assemblies are stacked around a pivot cartridge, provided the AHSA used should be constructed such that a part thereof comes into collision with an object fixed to a casing through an elastic member and its pivoting range is limited thereby.

If the latch member is constructed such that its mass or moment of inertia is smaller than that of the inertia member and the latch member can move upon receipt of force from the inertia member, the latch member can latch AHSA upon receipt of force from the inertia member even if it cannot move to the latch position against an external shock. In the latch structure according to this embodiment, before the engaging portion of the latch member moves to the latch position to latch AHSA, the inertia member consumes a portion of shock energy as kinetic energy and hence the shock energy in latching is more attenuated, so that there is little shock energy even upon latching.

In a third aspect of the present invention there is provided a rotating disk storage device comprising a casing; a rotating disk storage medium having a recording surface and supported rotatably by the casing; an AHSA with a head/slider mounted thereon, the AHSA being supported by the casing so as to be pivotable in a first direction and a second direction; an elastic member which, using an elastic body, restricts the pivotal movement in the first direction of the AHSA, the elastic member being supported by the casing outside the rotating disk storage medium; an inertia member supported by the casing so as to be pivotable in both a third direction and a fourth direction, the inertia member receiving torque from the AHSA and moving pivotally in the fourth direction from a home position at least in a partial period in which a part of the AHSA comes into abutment against the elastic body, causing the elastic body to be deformed elastically, and in this state moves pivotally in the fourth direction; and a latch member having an engaging portion engageable with the to-be-engaged portion of the AHSA, the latch member being supported by the casing so as to be pivotable in a fifth direction and a sixth direction, the latch member receiving torque from the inertia member which moves pivotally in the fourth direction, thereby moving pivotally in the fifth direction from a home position and causing the engaging portion to move to a latch position.

By incorporating the inertia member and the latch member pivotably into the rotating disk storage device, the collision energy resulting from collision of AHSA with the elastic member attenuates during elastic deformation of the elastic member and is further consumed and attenuates as rotational energy of the inertia member. A linked latch structure wherein AHSA moves the inertia member pivotally, the inertia member moves the latch member pivotally, and the latch member can latch rebounding of the AHSA is convenient for incorporation thereof into a small-sized storage device.

In a fourth aspect of the present invention there is provided a method of latching an AHSA in a rotating disk storage device. The rotating disk storage device comprises a rotating disk storage medium; an AHSA with head/slider mounted thereon and being supported pivotably in both a first direction and a second direction; an elastic member which restricts a pivoting range in the first direction of the AHSA; a latch member supported pivotably, the latch member having an engaging portion for latching the AHSA moving pivotally in the second direction; and an inertia member supported pivotably so as to come into abutment against the latch member. The method comprises moving the AHSA pivotally in the first direction into abutment against the elastic member; bringing the AHSA into abutment against the inertia member and moving it pivotally at least in a partial period in which the AHSA moves pivotally in the first direction while causing the elastic member to be deformed elastically; bringing the inertia member into abutment against the latch member and moving it pivotally at least in a partial period in which the inertia member is abutted against the actuator head suspension assembly and moves pivotally; and moving the engaging portion of the latch member up to a latch position.

Embodiments of the present invention provide a rotating disk storage device having a stopper mechanism capable of attenuating collision energy against an AHSA immediately upon high-speed collision of the AHSA with an elastic member due to external shock, runaway during operation, or power failure. A rotating disk storage device may include a stopper mechanism capable of decreasing the frequency of an AHSA rebounding from the stopper mechanism and being latched by a latch mechanism. Further, there could be provided a rotating disk storage device having a latch mechanism capable of diminishing a shock which occurs at the time of latching an AHSA rebounding from a stopper mechanism.

DETAILED DESCRIPTION OF THE INVENTION

Figure 1:
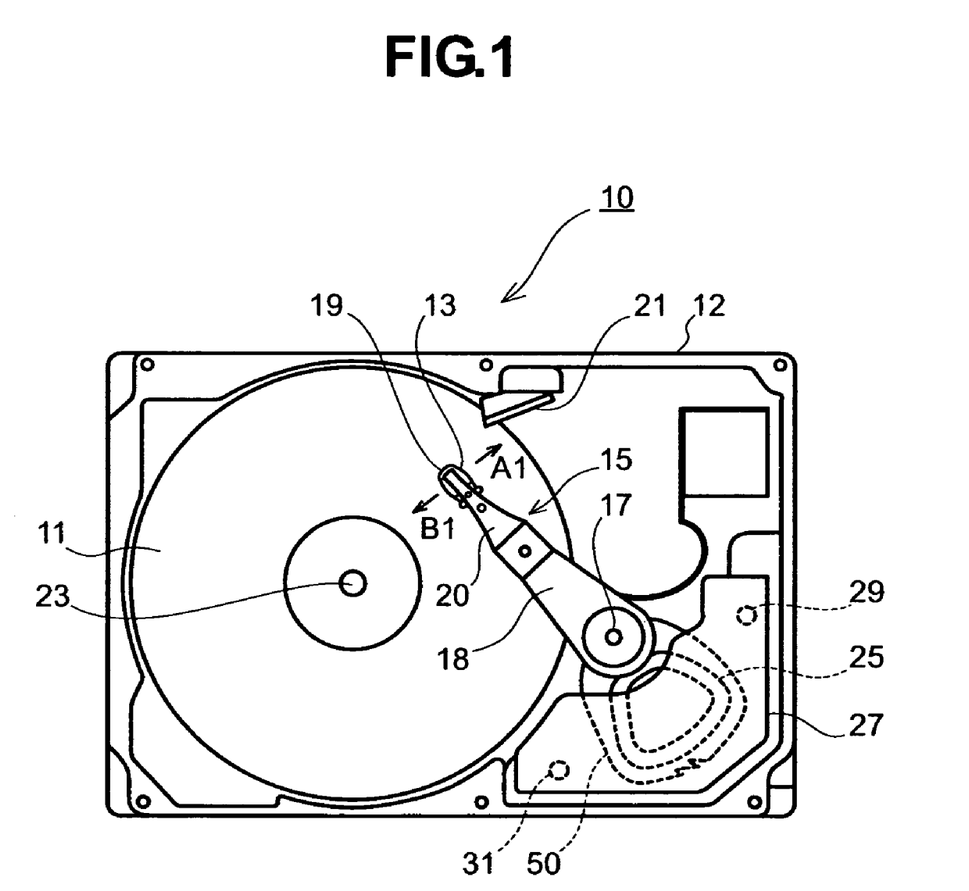
FIG. 1 is a schematic plan view of a magnetic disk drive 10 according to an embodiment of the present invention.

FIG. 1 is a schematic plan view of a magnetic disk drive 10 according to an embodiment of the present invention. The exterior of the magnetic disk drive 10 is covered with a casing body 12 and a casing cover (not shown) attached to the casing body. The casing body 12 is mainly composed of a base which provides a mounting surface to components and side walls to which the casing cover is attached.

A magnetic disk 11 has a recording surface with a magnetic layer formed thereon. The magnetic disk 11 is secured to a hub which is rotated by a spindle motor, and is adapted to rotate around a spindle shaft 23. In a storage device which adopts a contact start stop (CSS) method, the magnetic disk 11 has not only the recording surface but also a non-recording area which provides a retraction area for a slider. The magnetic disk 11 may be provided as a single disk or as a stack of plural disks, but in this embodiment there is adopted a single magnetic disk.

An AHSA 15 includes a head suspension assembly (HSA) 20, an actuator arm 18, a coil support 50, and a voice coil 25 which is held by the coil support. The AHSA 15 is attached to the base through a pivot cartridge so as to be pivotable about a pivot shaft 17. Mounting portions of the actuator arm, the coil support, and the pivot cartridge are formed integrally by die-casting aluminum or a synthetic resin as a non-magnetic material. But there may be adopted a so-called lamination type suspension structure wherein HSA itself is attached directly to the pivot cartridge.

In order that servo control is difficult to be influenced by external vibration or shock during operation, the AHSA 15 is constructed with its center of gravity lying above the pivot shaft. The HSA 20 is constructed to include a load beam attached to the actuator arm 18 and a flexure attached to the load beam. At a front end portion of the load beam is provided a margin lip or a tab 19. A head/slider 13 is attached to the flexure.

The head/slider 13 comprises a head which reads and/or writes data for the magnetic disk 11 and a slider which receives buoyancy from a current of air on the surface of the magnetic disk rotating with head mounted thereon and which thereby floats over the recording surface through a slight gap. The slider is attached to the flexure in such a manner that an air bearing surface is opposed to the recording surface of the magnetic disk 11. The load beam generates a pressure in a direction to push the head/slider 13 against the recording surface of the magnetic disk 11. A lubricant for the prevention of damage is applied to the recording surface of the magnetic disk because the head/slider 13 may contact the recording surface during operation.

Near a rear end portion of the AHSA 15 there is disposed a voice coil yoke 27 so as to cover the voice coil 25, the voice coil yoke 27 being supported by the base of the casing body 12. Together with the voice coil 25, the voice coil yoke 27 forms a VCM, and when the voice coil 25 is disposed within a magnetic field formed by both yoke and magnet and an electric current is allowed to flow in the coil, it is possible to let the AHSA 15 move pivotally in direction A1 or B1. An outer crash stop 31 and an inner crash stop 29 each formed to contain an elastic body such as rubber are secured to the underside of the voice coil yoke 27 so as to be erected on the base of the casing.

The outer crash stop 31 limits a direction in which the head/slider 13 of the AHSA 15 moves to the outside of the magnetic disk, while the inner crash stop 29 limits a direction in which the head/slider 13 moves toward the spindle shaft 23. A magnet is embedded in the outer crash stop 31 so as to lightly chuck a coil support 50 which comes into abutment against the outer crash stop 31. In constituting the outer crash stop, a rigid rod may be erected on the base and an elastic body may be provided at the abutting portion of the coil support, or a part of the coil support may be allowed to fulfill an elastic function, as indicated by reference numerals 46 and 47 in FIG. 6 of Japanese Patent Laid-open No. 2000-243044.

Figure 2:
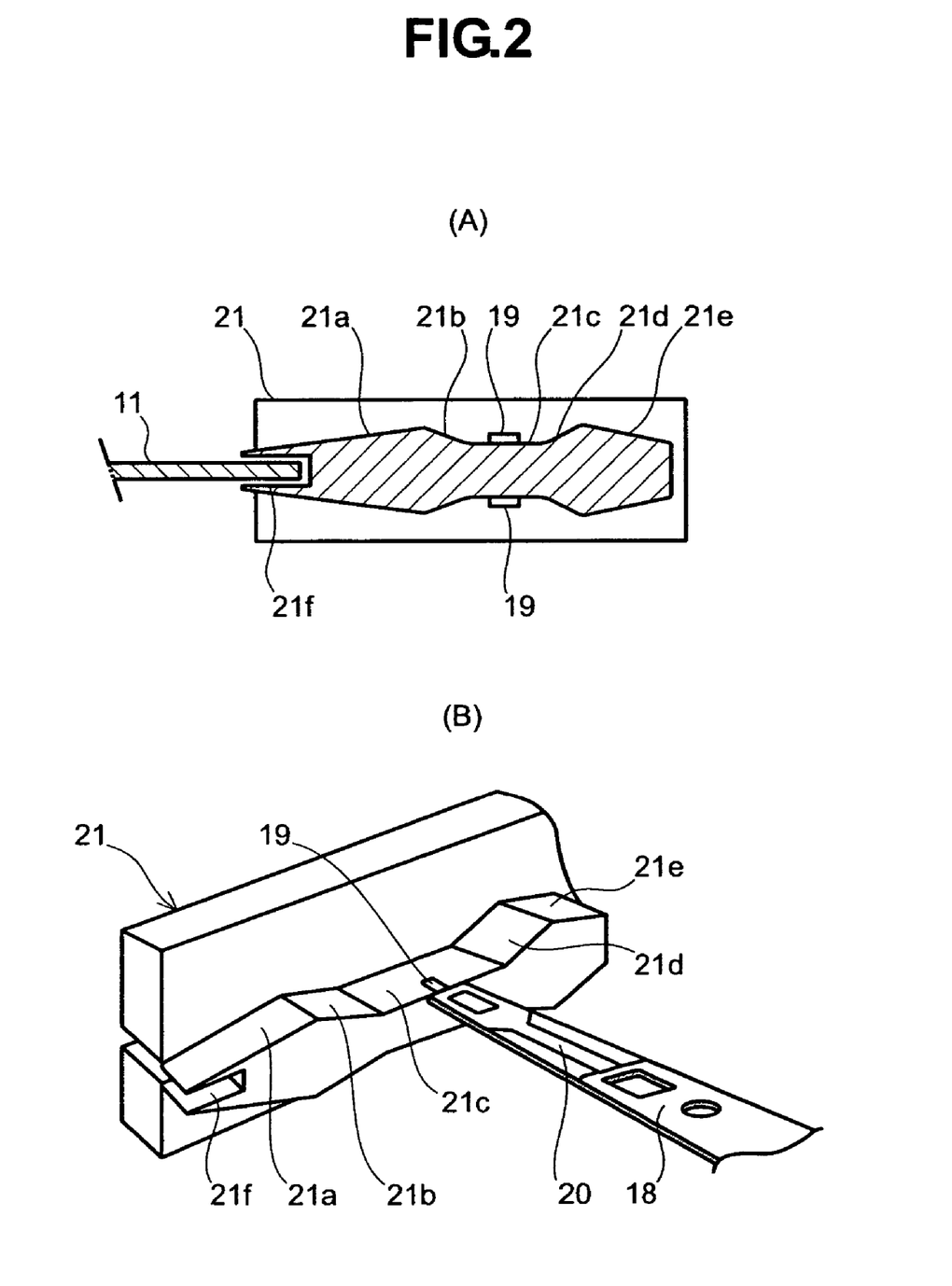
FIG. 2 comprises a side view and a perspective view of a ramp.

A ramp 21 is mounted near the outside of the magnetic disk 11. FIG. 2 shows a side view and a perspective view of the ramp 21, in which (A) shows margin lips 19 of two AHSAs and (B) shows a part of one AHSA for the simplification of explanation. A slit 21$f$ is formed in the ramp 21 and an outer periphery portion of the magnetic disk 11 is fitted in the slit 21$f$ rotatably. The ramp 21 provides an area to which the head/slider is retracted before the rotating speed of the magnetic disk 11 decreases below a predetermined number of revolutions. The ramp 21 has slant faces 21$a$, slant faces 21$b$, flat faces 21$c$, slant faces 21$d$, and slant faces 21$e$ successively from the side close to the magnetic disk 11. The slant faces 21$d$ and 21$e$ are provided for inserting the margin lips 19 from a rear portion of the ramp after the ramp 21 is mounted to the casing 12 to mount the AHSAs 15 to the base.

With respect to each AHSA 15, if in FIG. 1 the AHSA 15 is moved pivotally in the direction of A1 from the recording surface of the magnetic disk 11, the margin lip 19 comes into contact with the slant face 21$a$ and the head/slider 13 is lifted slightly from its floating position. As the AHSA 15 further moves pivotally, the head/slider 13 reaches a boundary between the slant faces 21$a$ and 21$b$ while moving gradually in a direction away from the recording surface of the magnetic disk. The load beam of HSA 20 is constructed so as to provide pressure in a direction to push the head/slider 13 against the recording surface. While the margin lip 19 slides on the slant face 21$a$ and reaches the boundary between the slant faces 21$a$ and 21$b$, the pressure of the HSA 20 becomes stronger gradually, so that a frictional force acting to prevent the pivotal movement of the AHSA 15 in A1 direction increases.

The driving force of VCM overcomes the frictional force and can move the AHSA 15 to a further extent in A1 direction. The VCM is controlled in such a manner that, as the margin lip 19 further moves pivotally in A1 direction after reaching the flat face 21$c$ via the slant face 21$b$, the coil support 50 collides with an outer crash stop 3 and the margin lip 19 stops on the flat face 21$c$. The outer crash stop 31 is deformed elastically and attenuates the collision energy of AHSA 15. In an unloading operation in a controlled state, the magnet embedded in the outer crash stop attracts the coil support 50 and causes the AHSA 15 to stop in that position. Without the magnet, the AHSA 15 will somewhat move pivotally in B1 direction under a light reaction after collision and will stop on the flat face 21$c$ due to friction between the margin lip 19 and the flat face 21$c$.

The position at which the AHSA collides with the outer crash stop and stops by unloading in a normal operating condition except such abnormal conditions as runaway and power failure, is called home position of the AHSA. In the home position, the margin lip 19 is in engagement with the flat face 21$c$. The home position of the AHSA is sure to lie on the flat face 21c of the ramp, but not all margin lip positions on the flat face 21c are home positions of the AHSA.

In FIG. 2(A), the flat face 21c of the ramp 21 is spaced in the vertical direction from the recording surface of the magnetic disk 11, so when the margin lip 19 is engaged with the flat face 21c and the head/slider 13 is in its retracted state, the margin lip 19 is pushed against the flat face 21c by the load beam, generating a frictional force to prevent the pivoting motion of AHSA 15. In cooperation with the action of the slant face 21b, the frictional force acts to prevent the AHSA placed on the flat face 21c from moving toward the recording surface of the magnetic disk.

Therefore, with the frictional force of the flat face 21c and the attractive force of the magnet embedded in the outer crash stop, even if a weak shock is given from the exterior to the AHSA 15 placed in the home position, the AHSA 15 can stay in the home position or stay in the range of the flat face 21c or the slant face 21b. However, the frictional force of the flat face 21c and that of the slant face 21b, as well as the attractive force of the magnet, cannot be set so strong because it is necessary for the driving force of VCM to overcome them when the magnetic disk 11 is rotated to move AHSA 15 pivotally in B1 direction.

The magnetic disk drive 10 is constructed so as to move the AHSA 15 at high speed in A1 direction until collision of the AHSA with the outer crash stop in order to let the head/slider retract to the ramp 21 before turning OFF of the spindle motor in the event of sudden interruption of power supply or when it has become impossible to make control. Therefore, when a strong shock is given from the exterior to the magnetic disk drive or when the power supply of the magnetic disk drive is cut off suddenly or upon runaway of the same device, it is likely that the coil support 50 will strike vigorously against the outer crash stop 31 and the resulting reaction will cause the head/slider to move pivotally in B1 direction and land on the recording surface of the magnetic disk 11 which is in a standstill.

Figure 3:
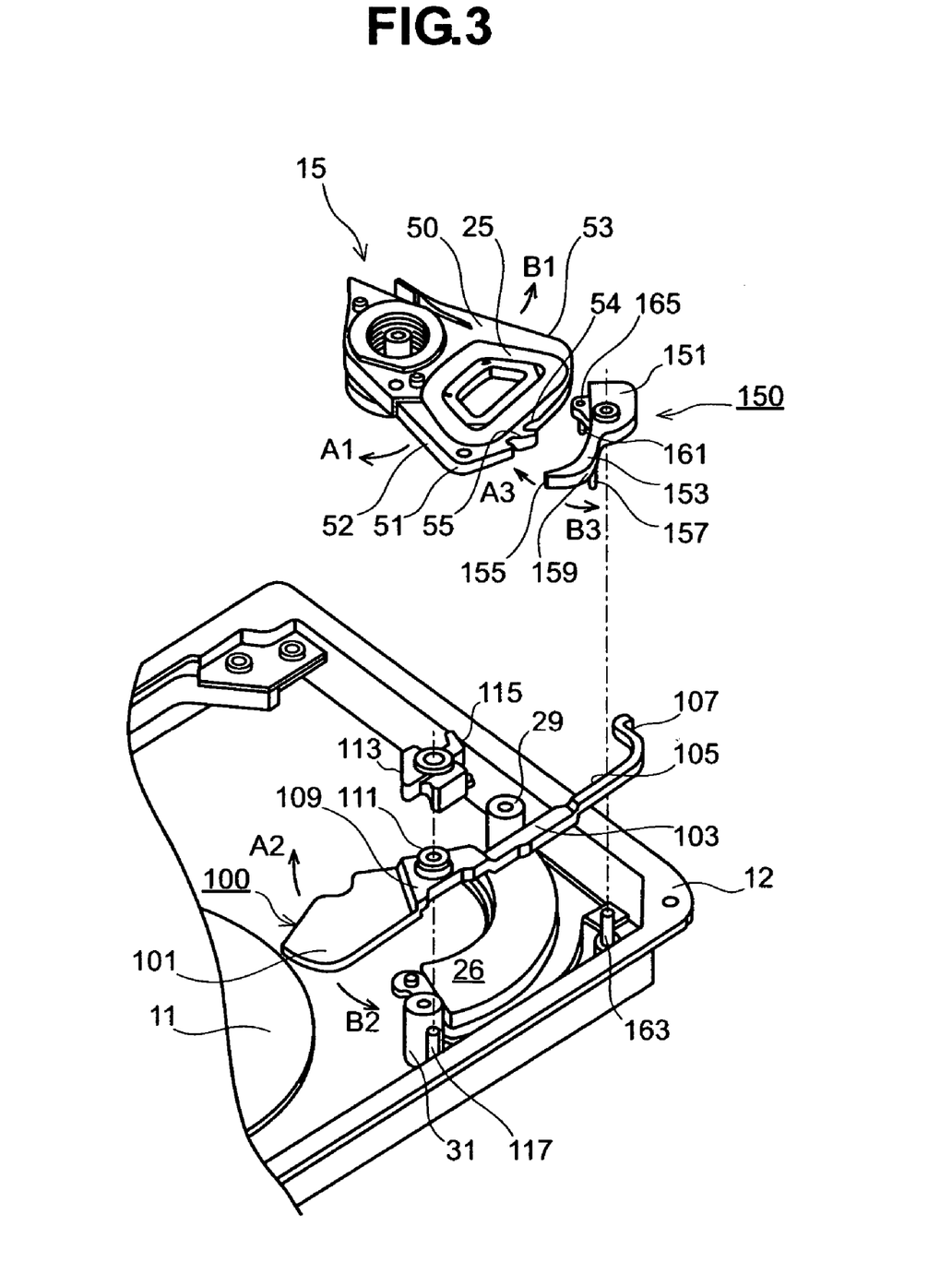
FIG. 3 is an exploded perspective view of a latch mechanism used in the embodiment.
Figure 4:
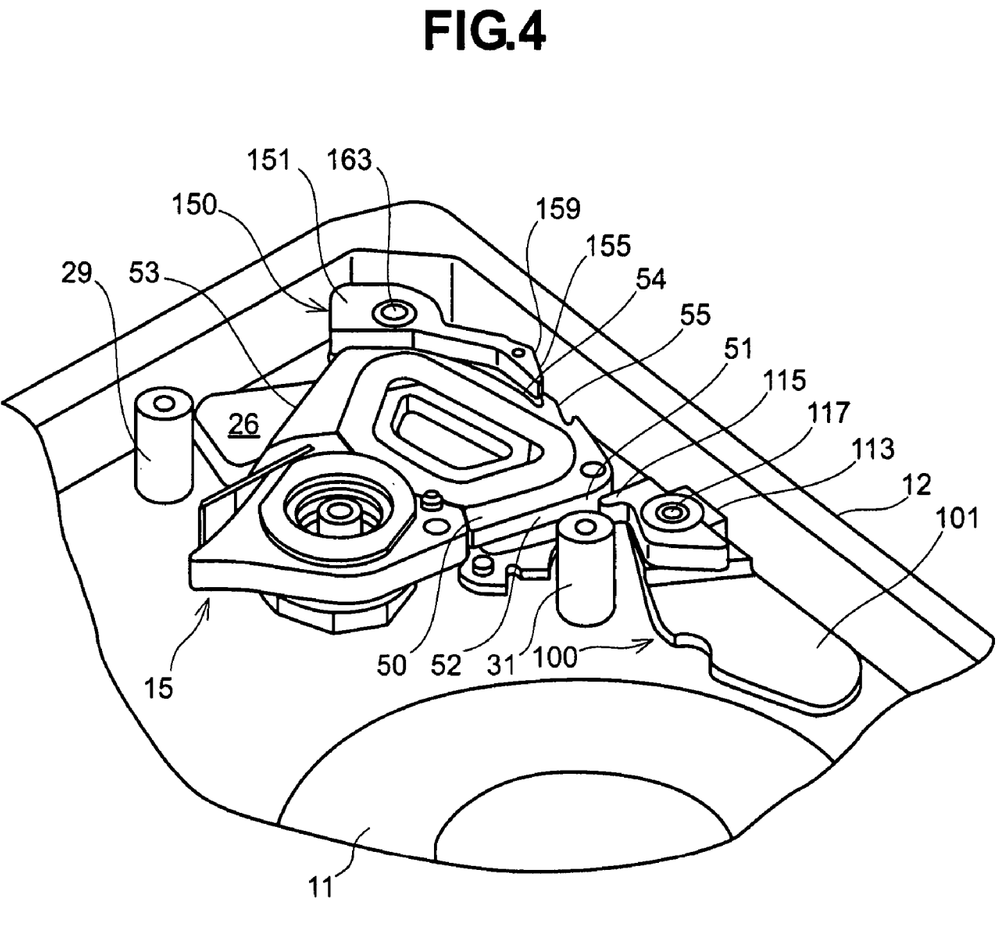
FIG. 4 is an assembly diagram thereof.

FIG. 3 is an exploded perspective view of a latch mechanism used in this embodiment and FIG. 4 is an assembly diagram of the latch mechanism. The latch mechanism is mainly composed of an inertia member 100, a latch member 150, the outer crash stop 31, and the coil support 50. The coil support 50 as a part of the AHSA 15 which is illustrated at only its rear portion surrounds the entire periphery of the voice coil 25. Two arms extend backward from near the area in which a pivot cartridge of the coil support 50 is inserted, one arm being provided with a first abutting portion 51 for imparting torque to the inertia member and a second abutting portion 52 for abutment against the outer crash stop 31, and the other arm being provided with an abutting portion 53 for abutment against the inner crash stop 29.

A magnetic metallic piece (not shown) for being attracted by the magnet embedded in the outer crash stop 31 is attached to the second abutting portion 52. The two arms are bent and connected together at a rear end of the AHSA 15. In the connecting portions of the arms there are formed a first to-be-engaged portion 54 and a second to-be-engaged portion 55 both of a cut-away shape so as to open at an angle in the pivoting direction of B1.

The inertia member 100 is provided with a long arm portion 103 and a wide balancer portion 101 on both sides of a hole into which a pivot shaft 117 is inserted. The inertia member 100 is supported pivotally about the pivot shaft 117 which is erected on the base. Since the inertia member 100 functions to absorb both shock energy and kinetic energy of AHSA, it is formed of a relatively heavy material such as metal so as to afford a relatively large moment of inertia. As for the material there is selected a non-magnetic material so as not to be influenced by a magnetic field from a voice coil yoke. The inertia member is formed so that the center of gravity based on the arm portion 103 and the balancer portion 101 lies on the pivot shaft 117.

Thus, if there occurs such a shock as suddenly stops movement in a direction in which the magnetic disk drive 10 rotates about the pivot shaft 117, the inertia member 100 moves pivotally, but fails to turn even if there occurs such a shock as is based on movement in a direction in which the magnetic disk drive 10 does not rotate about the pivot shaft 117. On side faces of the arm portion 103 there are provided a first abutting portion 105 at a position which faces the coil support 50 and a second abutting portion 107 at a position which faces the side opposite to the coil support 50, the first and second abutting portions being each abutted against a latch member.

A mounting surface 109 is formed around the pivot shaft of the inertia member 100. A hole formed centrally of an auxiliary member 113 is fitted on a boss 111, whereby the auxiliary member 113 is fixed to the mounting surface 109 and both auxiliary member 113 and the inertia member 100 pivotally move integrally about the pivot shaft 117. The auxiliary member 113 is provided with an abutting portion 115 for abutment against the first abutting portion 51 of the coil support 50. The auxiliary member 113 is for transmitting collision energy resulting from collision of the coil support 50 with the outer crash stop 31 to the inertia member 100. The auxiliary member 113 may be substituted by a structure wherein the inertia member 100 abuts the coil support directly.

A latch member 150 is provided with an arm portion 153 and a balancer portion 151 on both sides of a hole through which a pivot shaft 163 passes, and is supported pivotally about the pivot shaft 163 which is erected on the base. The latch member 150 is constructed so that the moment of inertia thereof is about one eightieth of that of the inertia member 100. For example, the latch member 150 is formed using a relatively light material such as a plastic material. As for the material there is selected a non-magnetic material so as not to be influenced by a magnetic field from the voice coil yoke. Irrespective of this embodiment, the latch member may be constructed so that its moment of inertia becomes approximately one tenth or less of that of the inertia member.

The latch member 150 is formed so that the center of gravity based on both arm portion 153 and balancer portion 151 lies on the pivot shaft 163. Therefore, the latch member moves pivotally with a shock acting in a direction in which the magnetic disk drive 10 rotates about the pivot shaft 163, but does not pivot with a shock acting in a direction in which the magnetic disk drive 10 does not rotate about the pivot shaft 163. At a front end of the arm portion 153 there is formed a wedge-like engaging portion 155 capable of engaging the first or the second to-be-engaged portion of the coil support. Further, a first abutting pin 157 capable of coming into abutment against the first abutting portion 105 of the inertia member projects from the underside of the arm portion 153, while a second abutting pin 161 capable of coming into abutment against the second abutting portion 107 of the inertia member projects from the underside of the balancer portion 151.

Further, an abutting portion 159 for abutment against a wall portion of the casing body 12 is formed on a side face of the arm portion 153. A magnet 165 is embedded in the balancer portion 151. The magnet 165 is constructed so as to create a biasing force for attracting a magnetic iron piece (not shown) provided in part of the coil support 50 when the coil support 50 has approached the magnet and for moving the latch member pivotally in B3 direction. The biasing force may be developed using a spring centered on the pivot shaft 163, the spring being abutted at one end thereof against a side wall of the casing and engaged at an opposite end thereof with the arm portion 153. Further, there are illustrated an outer crash stop 31 and an inner crash stop 29 both erected on the base which is formed in cylindrical shape.

In FIG. 4 there is illustrated a state in which the coil support 50, the inertia member 100, and the latch member 150 are installed in the base. The second abutting portion 52 and the third abutting portion 53 can be abutted against the out crash stop 31 and the inner crash stop 29, respectively, of the coil support 50. Next, the operation of the latch mechanism constructed as above will be described below with reference to FIGS. 5 to 7.

Operation of the Latch Mechanism upon Runaway of AHSA

Figure 5:
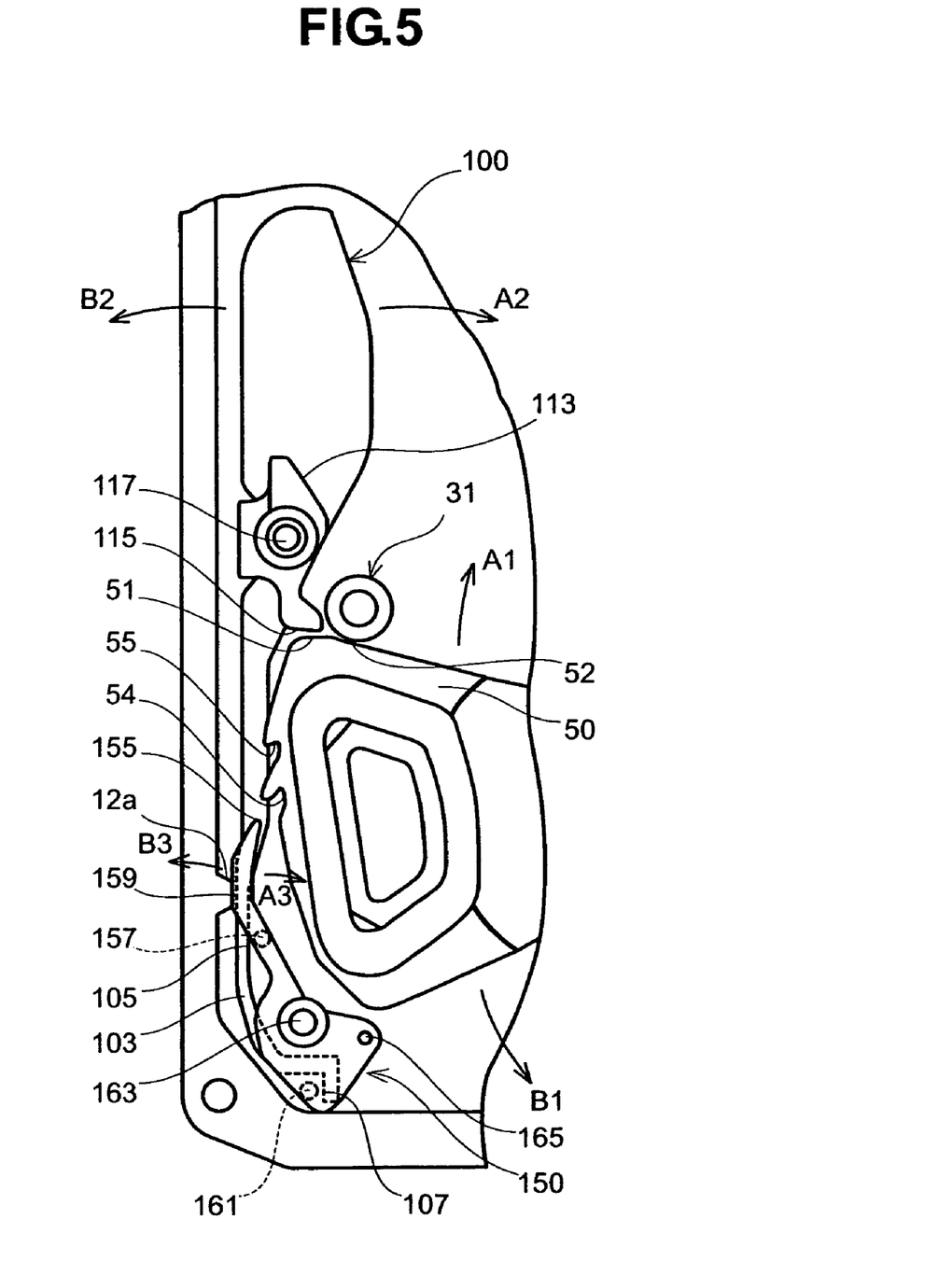
FIG. 5 illustrates a state of an instant in which an AHSA collides with an outer crash stop.

FIG. 5 shows a state in an instant in which AHSA 15 collides with the outer crash stop 31 after runaway pivotally in A1 direction at a higher speed than the normal speed. In the latch member 150, the magnet 165 attracts the magnetic metallic piece of the coil support 50 and moves pivotally in B3 direction and the abutting portion 159 is at a standstill in abutment against a side wall 12a of the casing. A slight gap is present between the first abutting pin 157 and the first abutting portion 105 and/or between the second abutting pin 161 and the second abutting portion 107.

When the latch member moves pivotally in B3 direction, the first abutting pin 157 comes into abutment against the first abutting portion 105 and acts to move the inertia member 100 in A2 direction. As the inertia member 100 moves pivotally in A2 direction, the second abutting portion 107 of the inertia member approaches the second abutting pin 161 of the latch member. Therefore, when the abutting portion 159 of the latch member comes into abutment against the side wall 12a of the casing before abutment of the second abutting pin 161 against the second abutting portion 107, the inertia member 100 is in a state of freely pivotable by a distance corresponding to the gap between the second abutting pin 161 and the second abutting portion 107. This state corresponds to a home position with respect to the inertia member 100 and the latch member 150. In the concept of the present embodiment there is included a construction wherein, in the home position, the first abutting pin 157 and the first abutting portion 105 come into contact with each other and the second abutting pint 161 and the second abutting portion 107 also come into contact with each other and wherein, upon pivotal movement of the inertia member 100 in B2 direction from the home position, the latch member 150 receives torque from the inertia member and moves pivotally in A3 direction.

In case of pivotal movement as in the ordinary unloading mode, the outer crash stop 31 comes into abutment against the second abutting portion 52 of the coil support 50 and the AHSA 15 deflects slightly, the resulting collision energy is consumed for compression of the elastic body. Further, a repulsive force which the AHSA 15 receives from the elastic body is weak. Consequently, the margin lip 19 stops at the home position which lies on the flat face 21c. At this time, since only the AHSA 15 operates, the inertia member 100 and the latch member 150 do not pivot from the home position.

In the event the AHSA 15 collides with the outer crash stop 31 at a high speed upon runaway or sudden power failure, the outer crash stop 31 is the first to deflect and absorbs and attenuates the shock energy. Further, as the AHSA 15 continues to move pivotally in A1 direction while applying an elastic deformation to the outer crash stop, the first abutting portion 51 of the coil support 50 comes into abutment against the abutting portion 115 of the auxiliary member 113 and causes the inertia member 100 to move pivotally in B2 direction.

If in the home position there is a gap between the first abutting portion 105 of the inertia member 100 and the first abutting pin 159 of the latch member 150, first only the inertia member 100 moves pivotally in B2 direction, and upon subsequent abutment of the first abutting portion 105 against the first abutting pin 157, the latch member 150 is given a torque from the inertia member and moves pivotally in A3 direction. In this state, collision energy resulting from collision of the AHSA 15 against the outer crash stop 31 is consumed by energy for deforming rubber elastically, a frictional force which the margin lip 19 receives from the flat face 21c, energy for rotating the inertia member 100 having a relatively large moment of inertia, and energy for rotating the latch member 150 having a relatively small moment of inertia. Thus, there can be obtained a large attenuation quantity in comparison with the case where the shock is absorbed by only the outer crash stop. In other words, the stopper mechanism used in this embodiment has a shock absorbing ability higher by an amount corresponding to energy for moving the inertia member pivotally.

If the AHSA 15 consumes all of the pivoting energy in A1 direction at this time point, it then moves pivotally in B1 direction under the repulsive force of the outer crash stop 31, but the amount of the pivotal movement is small. The abutting portion 52 of the coil support 50 is attracted by the magnet embedded in the outer crash stop, whereby the AHSA 15 can stop at the home position. Thereafter, the latch member 150 moves pivotally in B3 direction under the attractive action between the magnet 165 and the coil support 50 and returns to the home position, allowing the AHSA 15 to freely move pivotally.

Thus, the rotational energy of the inertia member 100 or the rotational energy of both inertia member 100 and latch member 150 is added to the compressive energy of the outer crash stop, so that the attenuation quantity of collision energy of AHSA 15 increases and the AHSA 15 can be stopped at the home position without latching operation even under a stronger shock than the conventional level of shock. Although the latching operation can bring the AHSA 15 into positive stop at the home position, a large shock acts on the AHSA 15, so it is preferable to let the AHSA be retracted to the home position without latching.

In the case where the pivoting speed of the AHSA 15 which moves pivotally in A1 direction is high and rotational energy thereof is large, the AHSA 15 further moves pivotally in A1 direction. Upon receipt of the torque from the AHSA 15, the inertia member 150 moves pivotally in B2 direction and imparts the torque to the latch member 150, causing the latch member to move pivotally in A3 direction until the engaging portion 155 of the latch member 150 reaches a latching position. The latching position indicates a position with respect to the inertia member, latch member and AHSA at which the engaging portion 155 of the latch member can engage the first to-be-engaged portion 54 or the second to-be-engaged portion 55 formed in the coil support 50.

Figure 6:
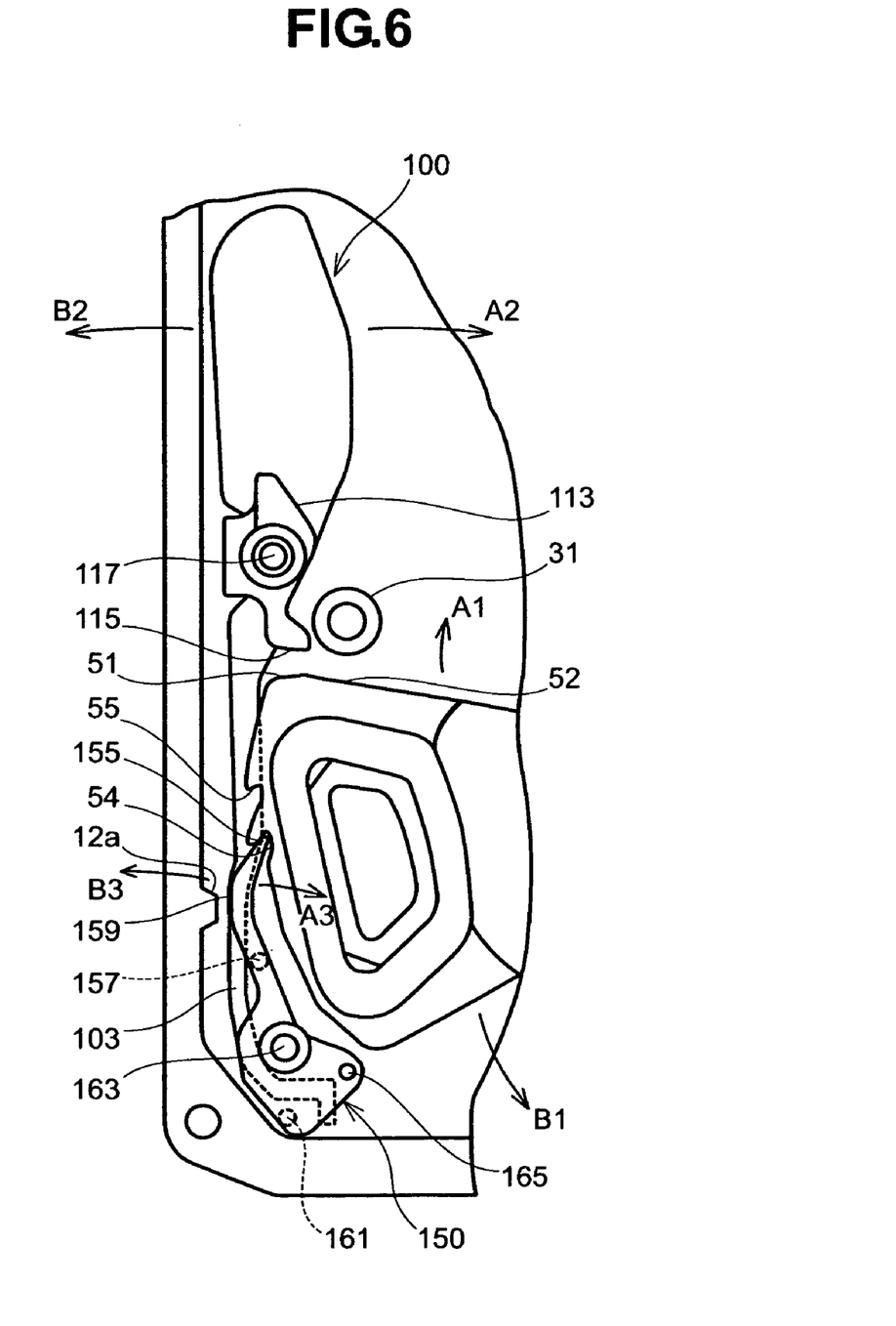
FIG. 6 illustrates a latched state of a coil support by the AHSA.

If the collision energy of the AHSA 15 cannot be absorbed by compressive absorption of the outer crash stop 31, rotational energy absorption of the inertia member 100 and latch member 150, and frictional force absorption of the margin lip 19 and the flat face 21c, the AHSA 15 rebounds and moves pivotally in B1 direction by a reaction induced when the compression of the elastic body reaches a limit. However, in the latch mechanism used in this embodiment, when the AHSA 15 rebounds and collides with the outer crash stop 31 with such a strength as causes the head/slider 13 to move to the recording surface of the magnetic disk 11, the inertia member 100 receives the torque and moves pivotally in B2 direction through the abutting portion 115 of the auxiliary member 113 according to the magnitude of the resulting deflection. Further, the first abutting pin 157 receives the torque from the first abutting portion 105 of the inertia member 100 and the latch member 150 moves pivotally in A3 direction, and since the engaging portion 155 has already reached the latching position, the rebounded coil support 50 is latched at its first to-be-engaged portion 54 by the engaging portion 155 of the latch member and does not pivot in B1 direction beyond the latch position. This state is shown in FIG. 6.

The angle at which the inertia member 100 causes the latch member to move pivotally from the home position up to the latching position is set small relative to the angle at which the AHSA 15 rebounds and moves pivotally up to the latching position. Therefore, even assuming that the AHSA 15, inertia member 100, and latch member 150 pivot at an equal angular velocity, the latch member 150 reaches the latching position before the AHSA 15 rebounds and reaches the latching position, so that it is possible to latch the first to-be-engaged portion 54 of the coil support positively.

In the event the first to-be-engaged portion 54 cannot be latched due to a delayed timing of arrival of the engaging portion 155 of the latch member 150 at the latching position, it is possible to latch the second to-be-engaged portion 55 which arrives at the latch position later than the first to-be-engaged portion 54. Although in this embodiment the coil support is formed with two to-be-engaged portions 54 and 55 in the pivoting direction of the AHSA 15, the concept of the present invention also includes the provision of three or more to-be-engaged portions.

There also is a case where the coil support 50 latched by the engaging portion 155 of the latch member 150 again moves pivotally in A1 direction by the resulting reaction, but since the kinetic energy of AHSA 15 is in an attenuated state, even if the AHSA 15 again collides with the outer crash stop 31, there does not remain such a degree of energy as permits the head/slider 13 to jump out to the recording surface. Consequently, the AHSA 15 stops at or near the home position by virtue of energy absorption through an elastic deformation of the outer crash stop, absorption as rotational energy of the inertia member and the latch member, attractive force of the magnet embedded in the outer crash stop, and the frictional force created between the margin lip 19 and the flat face 21c.

If the residual energy is not fully attenuated at the time of re-collision of the AHSA 15 with the outer crash stop 31, the coil support 50 is latched again by a cooperative action of the link mechanism comprising the inertia member 100 and the latch member 150 even upon rebounding of the coil support 50. In this embodiment, the elasticity of the elastic body in the outer crash stop 31 is set at an appropriate value such that, when the AHSA 15 retracts in the normal unloading operation, it is possible to absorb a shock without a pivotal moment of the inertia member 100, and the inertia member is allowed to pivot when the shock becomes large to a certain extent.

Figure 7:
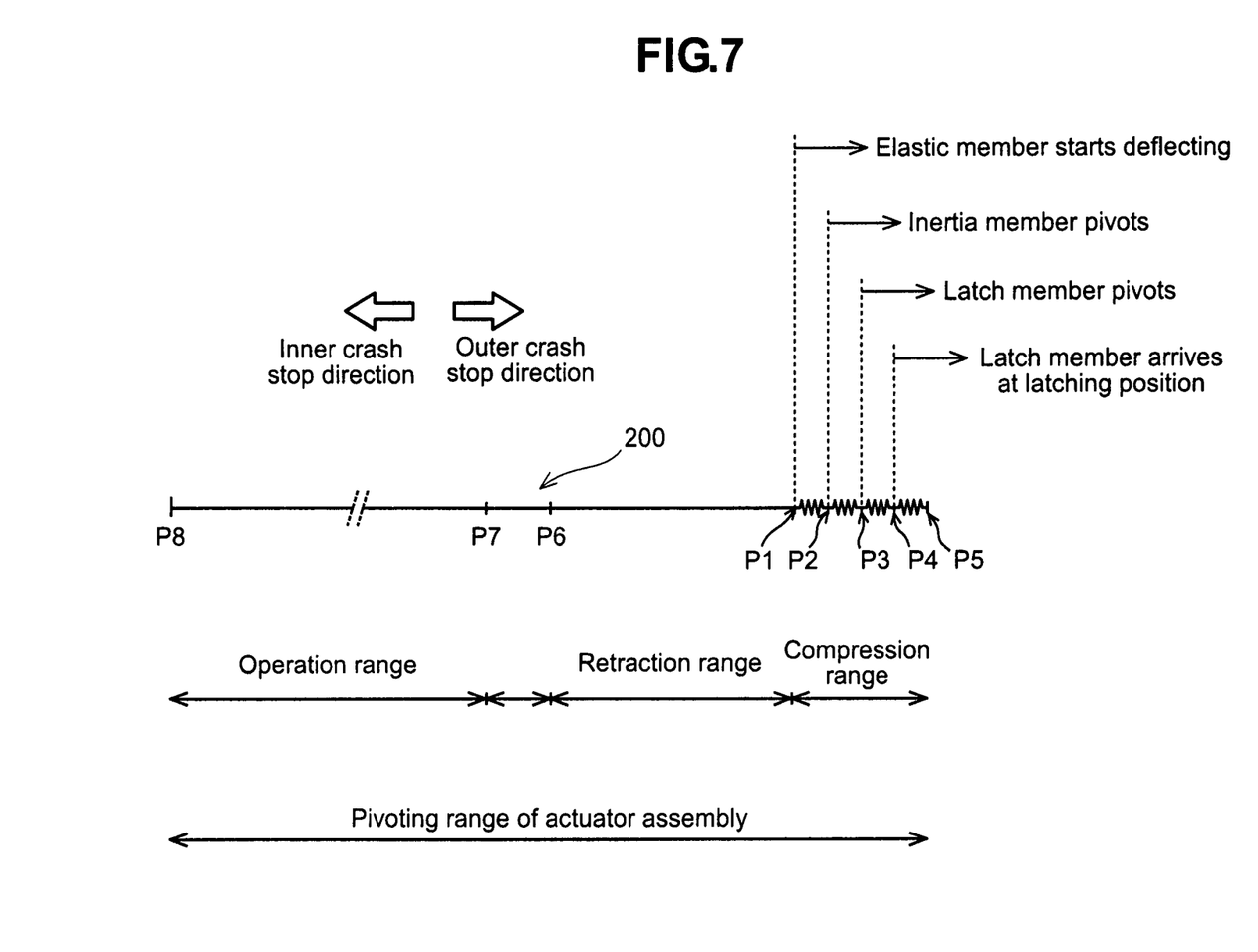
FIG. 7 illustrates a relation between a pivotal position of the AHSA and the operation of the latch mechanism.

Relation between the Pivotal Position of AHSA and the Operation of the Latch Mechanism Next, with reference to FIG. 7, a description will now be given of the relation between the pivotal movement of the AHSA 15, the stopper mechanism and the operation of the latch mechanism. A line 200 represents a pivoting range of the AHSA 15. The AHSA 15 pivots in a range delimited by both inner crash stop 29 and outer crash stop 31. For the head/slider, the inner crash stop 29 defines a track position close to the innermost periphery of the magnetic disk 11, serving as a start point of writing servo information. Therefore, the inner crash stop 29 is formed using a relatively hard elastic material. The pivoting limit position of the AHSA defined by the inner crash stop 29 is assumed to be position P8. The range from position P8 to position P7 is designated an operation range in which the head/slider floats over the recording surface.

The position P7 is a boundary position in which the floating head/slider moves to the slant face 21a of the ramp 21. The range between positions P7 and P6 is a range in which the margin lip 19 lies above the slant face 21a or 21b. The range between positions P6 and P1 is a retraction range in which the margin lip 19 lies above the flat face 21c of the ramp. Position P1 is a position in an instant of contact of the second abutting portion 52 of the coil support 50 with the outer crash stop 31, in which position the rubber is not deflected yet. Position P2 is a position in which the inertia member 100 lying in the home position receives the torque from the coil support 50 and starts moving pivotally in B2 direction.

Position P3 is a position in which the latch member 150 lying in the home position receives the torque from the pivoted inertia member 100 and starts pivoting in A3 direction. Position P4 is a position in which the engaging portion 155 of the latch member 150 reaches the latching position. Position P5 is a limit position in which the elasticity of the elastic body in the outer crash stop increases and limits the pivotal movement of the AHSA in A1 direction. Although in this embodiment the positions P1, P2, and P3 are set as different positions, there may be adopted as another embodiment a construction wherein P1, P2, and P3 are the same position and both inertia member and latch member move pivotally upon deflection of the elastic member. There also may be adopted as a further embodiment a construction wherein P2 and P3 are the same position and both inertia member and latch member are pivotally moved simultaneously after the elastic member has been deflected by a predetermined certain quantity. Such a construction permits adjusting the relation between the first abutting pin 157 and the abutting portion 105, the relation between the second abutting pin 161 and the second abutting portion 107, and the relation between the abutting portion 157 and the side wall 12a.

The range between positions P1 and P5 is a range in which the coil support moves pivotally in A1 direction while applying an elastic deformation to the rubber of the outer crash stop 31, or moves pivotally in B1 direction while receiving a repulsive force from the rubber. This range is designated a compression range. Thus, the pivoting range of AHSA includes the operation range, the retraction range, and the compression range. In FIG. 7, the compression range between P1 and P5 is illustrated on a larger scale to make the drawing easier to understand and therefore the reduced scale does not coincide with the actual range.

Operation of the Latch Mechanism when AHSA Pivots in A1 Direction by Shock

Next, the following description relates to the operation of the latch mechanism in this embodiment when the AHSA 15 moves pivotally in A1 direction upon exertion of a shock on the magnetic disk drive 10 from the exterior. In this case, the operation of the latch mechanism is different from that in runaway described above. Torque induced by the shock is applied to both inertia member 100 and latch member 150, acting to move them pivotally from the home position. The shock applied to the magnetic disk drive involves various parameters such as strength, direction, rotation or non-rotation, and the center of rotation, and thus the behaviors of AHSA 15, inertia member 100, and latch member 150 are complicated upon exertion thereon of an external shock. However, the AHSA 15 is constructed so that its center of gravity lies on the pivot shaft 17, so when it moves pivotally, it is presumed that a shock has given to the magnetic disk drive 10 in a direction of rotation centered on the pivot shaft 17 or a vicinity thereof.

Such a shock can be simulated in a state in which the magnetic disk drive 10 is supported and moved pivotally in A1 direction by a tester so as to be rotatable about the pivot shaft 17 of AHSA 15 and is brought into collision with a fixed object to stop its rotation suddenly. The components accommodated in the magnetic disk drive 10 except those held movably stop their movement in A1 direction suddenly upon collision, but the AHSA 15, inertia member 100, and latch member 150 continue their movement by inertia.

Since the pivot shaft 117 of the inertia member 100 and the pivot shaft 163 of the latch member 150 are positioned in proximity to the pivot shaft 17, it is presumed that an approximately equal angular acceleration is applied to the AHSA 15, inertia member 100, and latch member 150 as a result of shock. With a shock, the inertia member 100 moves pivotally in A2 direction and the latch member 150 moves pivotally in A3 direction. When the latch member 150 pivots in A3 direction, the first and second abutting pin 157, 161 do not come into abutment against the first and second abutting portions 105, 161 of the inertia member 100, so that the engaging portion 155 moves to the latching position without being influenced by the inertia member 100.

If the time of contact of the second abutting portion 52 of the coil support 50 with the outer crash stop 31 is long, the magnet 165 of the latch member 150 attracts the metallic piece of the coil support 50, pivots in B3 direction and returns to the home position. If the collision speed of AHSA is low and shock energy is weak, the AHSA 15 stops at or near the home position by virtue of energy absorption by elastic deformation of the outer crash stop, rotational energy absorption of both inertia member and latch member, attraction of the second abutting portion by the magnet embedded in the outer crash stop, and a frictional force induced between the margin lip 19 and the flat face 21c.

If the speed of collision of the AHSA 15 with the outer crash stop 31 is so high that it cannot be stopped by the outer crash stop and rebounds and moves pivotally in B1 direction, the biasing force of the magnet 165 permits the AHSA 15 to rebound and reach the latching position earlier than the latch member 150 leaving the latching position, resulting in that the first engaging portion 54 or the second engaging portion 55 of the AHSA 15 is latched by the engaging portion 155.

However, according to the construction of this embodiment, when the AHSA 15 collides with the outer crash stop 31, the abutting portion 115 of the auxiliary member 113 receives the torque from the first abutting portion 51 of the coil support and the inertia member 100 moves pivotally in B2 direction, further, the latch member 150 receives the torque from the inertia member and moves pivotally in A3 direction. Therefore, even if the AHSA 15 rebounds at the outer crash stop 31, the first to-be-engaged portion 54 or the second to-be-engaged portion 55 of the coil support can be latched positively by the engaging portion 155.

Operation of the Latch Mechanism when AHSA Pivots in B1 Direction by Shock

Next, a description will be given of the operation of the latch mechanism in this embodiment upon exertion of a shock from the exterior to the magnetic disk drive 10 in a retracted state of the AHSA 15 to the home position. It is presumed that, when a pivoting torque in B1 direction is applied to the AHSA 15, a pivoting torque in B2 direction and a pivoting torque in B3 direction are simultaneously applied to the inertia member 100 and the latch member 150, respectively.

However, since the moment of inertia of the latch member 150 is smaller than that of the inertia member 100, the first abutting pin 157 of the latch member 150 comes into abutment against the first abutting portion 105 of the inertia member, and the latch member 150 receives the torque from the inertia member 100 and moves pivotally in A3 direction. The angle at which the latch member 150 is moved by the inertia member 100 pivotally up to the latching position from the home position is set small relative to the angle at which the AHSA 15 moves pivotally from the home position to the latching position.

Therefore, even if the coil support 50 receives a pivoting shock in B1 direction, the latch mechanism used in this embodiment can latch the AHSA 15 at the latching position. As to the behavior of the latch mechanism upon further pivoting in A1 direction of the AHSA 15 due to a latching reaction and re-collision with the outer crash stop 31, it is as described previously.

More specifically, even if the inertia member 100 and the latch member 150 return to the home position, if the collision energy of the AHSA 15 is large, the inertia member 100 receives the torque from the coil support 50 during elastic deformation of rubber, and by a cooperative operation of both inertia member 100 and latch member 150, the engaging portion 155 of the latch member 150 moves to the latching position and assumes a latchable state. If the collision energy is small, the AHSA 15 can stay in the retraction range.

Although an embodiment of the present invention has been described above with reference as an example to a load/unload type magnetic disk drive using a ramp, the present invention is also applicable to a contact start/stop type magnetic disk drive in which a head/slider is retracted to a retraction area formed near an inner periphery of the magnetic disk 11. In this case, as is apparent to those skilled in the art, the device may be constructed such that the inner crash stop functions to absorb a shock, and while the inner crash stop is deformed elastically, the inertia member receives torque from the coil support and causes the latch member to move pivotally up to the latching position.

Figure 8:
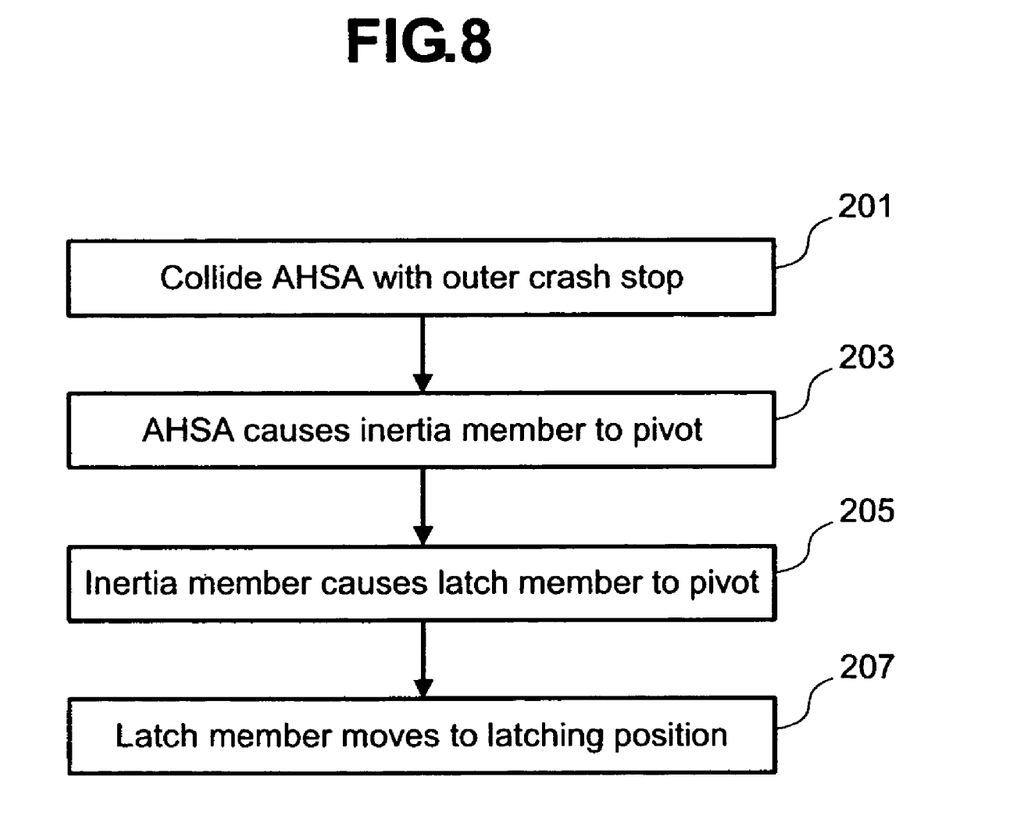
FIG. 8 is a flow chart showing a latching method according to the embodiment.

Next, with reference to FIG. 8, a description will be given about in what manner the latch mechanism in the rotating disk storage device adopted in this embodiment converts shock energy into rotational energy through an elastic member and a rebounding impact force is attenuated to effect latching. In block 201, the AHSA 15 is moved pivotally in A1 direction into collision with the outer crash stop 31. In block 203, the AHSA 15 is abutted against the inertia member 100 and is moved pivotally at least in a partial period in which the AHSA pivots in A1 direction while allowing the outer crash stop 31 to be deformed elastically.

In block 205, the inertia member 100 is abutted against the latch member 150 and is moved pivotally at least in a partial period in which the inertia member 100 is abutted against the AHSA and is moved pivotally. In block 207, the inertia member causes the engaging portion of the latch member to move up to the latching position. Therefore, even if the AHSA collides with the elastic member and rebounds, a part of shock energy is consumed as rotational energy of the inertia member and hence it is possible to diminish the shock in rebounding.

Although the present invention has been described on the basis of its specific embodiment illustrated in the drawings, it will be understood by any person skilled in the art that the present invention is not limited to such a specific embodiment, but that any known changes may be added and other embodiments may be adopted.

Embodiments of the present invention are applicable to rotating disk storage devices at large, particularly to those used in an environment in which they are apt to undergo a shock.

What is claimed is:

1. A rotating disk storage device comprising:
   a rotating disk storage medium having a recording surface;
   an actuator head suspension assembly with a head/slider mounted thereon, said actuator head suspension assembly being pivotable in both first and second directions;
   an elastic member which restricts a pivoting range in the first direction of said actuator head suspension assembly; and
   an inertia member which is configured to receive a force directly from said actuator head suspension assembly and move at least in a partial period in which a part of the actuator head suspension assembly comes into abutment against said elastic member, causing the elastic member to be deformed elastically;
   a latch member for restricting a pivotal movement of said actuator head suspension assembly, said latch member receiving force from said moving inertia member, thereby moving and causing said latch member to move into a latch position.

2. A rotating disk storage device according to claim 1, wherein the motion of said inertial member is a rotational motion or a pivotal motion.

3. A rotating disk storage device according to claim 2, wherein said inertia member is constituted pivotably about a pivot shaft and comprises an arm positioned on one side of said pivot shaft and a wide portion positioned on the other side of the pivot shaft.

4. A rotating disk storage device according to claim 1, wherein, when a part of said actuator head suspension assembly comes into abutment against said elastic member at a first position, causing the elastic member to be deformed elastically, and in this state moves pivotally in the first direction and reaches a second position, said inertia member receives the force from said actuator head suspension assembly and starts motion.

5. A rotating disk storage device comprising a rotating disk storage medium having a recording surface, an actuator head suspension assembly with a head/slider mounted thereon and having a to-be-engaged portion, said actuator head suspension assembly being pivotable in both first and second directions, an elastic member which restricts a pivoting range in the first direction of said actuator head suspension assembly, and a latch mechanism capable of latching said actuator head suspension assembly to prevent said head/slider from moving onto said recording surface when said rotating disk storage medium rotates at a number of revolutions below a predetermined number of revolutions or is at a standstill, wherein said latch mechanism comprises:
   an inertia member configured to receive a force directly from said actuator head suspension assembly and move at least in a partial period in which a part of the actuator head suspension assembly comes into abutment against said elastic member, causing the elastic member to be deformed elastically; and
   a latch member having an engaging portion for latching said to-be-engaged portion to restrict a pivotal movement in the second direction of said actuator head suspension assembly, said latch member receiving a force from said moving inertia member, thereby moving and causing said engaging portion to move up to a latch position.

6. A rotating disk storage device according to claim 5, wherein said inertia member is larger in mass than said latch member.

7. A rotating disk storage device according to claim 5, wherein, when a part of said actuator head suspension assembly comes into abutment against said elastic member at the first position, causing the elastic member to be deformed elastically, and in this state moves pivotally in the first direction and reaches a second position, said inertia member receives the force from said actuator head suspension assembly and starts moving.

8. A rotating disk storage device according to claim 7, wherein, when a part of said actuator head suspension assembly further moves pivotally in the first direction and reaches a third position from the second position which third position lies in the first direction, said latch member receives a force from said inertial member and starts moving.

9. A rotating disk storage device according to claim 8, wherein, when a part of said actuator head suspension assembly further moves pivotally in the first direction and reaches a fourth position from the third position which fourth position lies in the first direction, the engaging portion of said latch member reaches said to-be engaged portion.

10. A rotating disk storage device according to claim 5, wherein, when a part of said actuator head suspension assembly moves pivotally in the second direction with a repulsive force induced upon abutment thereof against said elastic member, the engaging portion of said latch member latches the to-be-engaged portion of the actuator head suspension assembly.

11. A rotating disk storage device according to claim 5, wherein, when a shock is given from the exterior to the rotating disk storage device, said inertia member, which is adapted to move with a shock, applies a force to said latch member and causes said engaging portion to move to the latch position.

12. A rotating disk storage device comprising:
   a casing;
   a rotating disk storage medium having a recording surface and supported rotatably by said casing;
   an actuator head suspension assembly with a head/slider mounted thereon, said actuator head suspension assembly being supported by said casing so as to be pivotable in a first direction and a second direction;
   an elastic member which, using an elastic body, restricts the pivotal movement in the first direction of said actuator head suspension assembly, said elastic member being supported by said casing outside said rotating disk storage medium;
   an inertia member supported by said casing so as to be pivotable in both a third direction and a fourth direction, said inertia member configured to receive a torque directly from said actuator head suspension assembly and move pivotally in the fourth direction from a home position at least in a partial period in which a part of said actuator head suspension assembly comes into abutment against said elastic body, causing the elastic body to be deformed elastically; and
   a latch member having an engaging portion engageable with the to-be-engaged portion of said actuator head suspension assembly, said latch member being supported by said casing so as to be pivotable in both a fifth direction and a sixth direction, said latch member receiving a torque from said inertia member which moves pivotally in the fourth direction, thereby moving pivotally in the fifth direction from a home position and causing said engaging portion to move to a latch position.

13. A rotating disk storage device according to claim 12, wherein, when a part of said actuator head suspension assembly comes into abutment against said elastic member at the first position and moves pivotally in the first direction while causing the elastic member to be deformed elastically and reaches a second position, said inertia member receives the torque from said actuator head suspension assembly and moves pivotally in the fourth direction.

14. A rotating disk storage device according to claim 13, wherein said latch member receives the torque from said inertia member and moves pivotally in the fifth direction and the engaging portion of said latch member reaches the latch position.

15. A rotating disk storage device according to claim 12, wherein a moment of inertia of said inertia member is larger than a movement of inertia of said latch member.

16. A rotating disk storage device according to claim 15, wherein, when a shock is given to the rotating disk storage device, said actuator head suspension assembly moves pivotally in the first direction with the shock, said inertia member receives a torque from the actuator head suspension assembly and moves pivotally in the fourth direction, and said latch member receives the torque from said inertia member and moves pivotally in the fifth direction, causing said engaging portion to move to the latch position.

17. A rotating disk storage device according to claim 15, wherein, when a shock is given to the rotating disk storage device, said actuator head suspension assembly moves pivotally in the second direction with the shock, said inertia member moves pivotally in the fourth direction with the shock, and said latch member receives a torque from said inertia member and moves pivotally in the fifth direction, causing said engaging portion to move to the latch position.

18. A rotating disk storage device according to claim 12, further comprising a biasing member configured to cause said latch member to move pivotally in the sixth direction and return to the home position from the latch position.

19. A rotating disk storage device according to claim 18, wherein said inertia member receives a torque from said latch member and returns to the home position.

20. A rotating disk storage device according to claim 12, wherein said inertia member comprises an arm positioned on one side of a pivot shaft and a wide portion positioned on the other side of the pivot shaft, said arm having an abutting portion against said latch member.

21. A rotating disk storage device according to claim 12, further comprising, as a substitute for said elastic member, a rigid stopper supported by said casing and an elastic structure provided in said actuator head suspension assembly.

\* \* \* \* \*